(12) United States Patent
Weda et al.

(10) Patent No.: US 9,287,975 B2
(45) Date of Patent: Mar. 15, 2016

(54) SETTING UP HYBRID CODED-LIGHT—ZIGBEE LIGHTING SYSTEM

(75) Inventors: Johannes Weda, Nijmegen (NL); Roel Peter Geert Cuppen, Venio (NL); Steven Broeils Luitjens, Eindhoven (NL); Stefan Henricus Swinkels, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 234 days.

(21) Appl. No.: 13/997,421

(22) PCT Filed: Dec. 19, 2011

(86) PCT No.: PCT/IB2011/055785
§ 371 (c)(1),
(2), (4) Date: Aug. 2, 2013

(87) PCT Pub. No.: WO2012/090116
PCT Pub. Date: Jul. 5, 2012

(65) Prior Publication Data
US 2013/0300314 A1    Nov. 14, 2013

(30) Foreign Application Priority Data

Dec. 29, 2010 (EP) ..................................... 10197222

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |

(Continued)

(52) U.S. Cl.
CPC ............ *H04B 10/114* (2013.01); *H04B 10/116* (2013.01); *H04B 10/1149* (2013.01); *H05B 37/0272* (2013.01)

(58) Field of Classification Search
USPC .................................................. 315/291–311
See application file for complete search history.

(56) References Cited

U.S. PATENT DOCUMENTS

| | | | |
|---|---|---|---|
| 2009/0026978 A1 | 1/2009 | Robinson | |
| 2009/0230895 A1* | 9/2009 | De Prycker et al. | .......... 315/317 |

(Continued)

FOREIGN PATENT DOCUMENTS

| | | |
|---|---|---|
| JP | 2012523660 A | 10/2012 |
| WO | 03007665 A1 | 1/2003 |

(Continued)

*Primary Examiner* — Brandon S Cole
(74) *Attorney, Agent, or Firm* — Meenakshy Chakravorty

(57) ABSTRACT

A lighting system (100) comprising a central lighting device (111), at least one satellite lighting device (121, 131), and a controller (141) for adjusting light settings, is provided. The controller is arranged for transmitting, in response to a user request (140), an association request over a first communication link (142). The central lighting device is arranged for receiving the association request and re-transmitting the association request over a second communication link by means of coded light (112). The satellite lighting device is arranged for transmitting, in response to receiving the association request, its identifier to the central lighting device. The identifier is only transmitted if an association process is enabled. The association process is enabled, in response to a user request, during a limited time period. The central lighting device is further arranged for associating, in response to receiving the identifier, the satellite lighting device with the central lighting device.

12 Claims, 3 Drawing Sheets

(51) Int. Cl.
   *H04B 10/114*   (2013.01)
   *H04B 10/116*   (2013.01)

(56) References Cited

U.S. PATENT DOCUMENTS

| | | |
|---|---|---|
| 2010/0207548 A1 | 8/2010 | Iott |
| 2010/0318201 A1* | 12/2010 | Cuppen et al. ................. 700/90 |
| 2011/0050132 A1* | 3/2011 | Hooijer et al. ................ 315/297 |
| 2012/0194095 A1* | 8/2012 | Ashdown et al. ............. 315/292 |
| 2013/0214698 A1* | 8/2013 | Aliakseyeu et al. .......... 315/292 |
| 2013/0300314 A1* | 11/2013 | Weda et al. ................... 315/291 |
| 2014/0285096 A1* | 9/2014 | Cuppen et al. ................ 315/153 |
| 2015/0022123 A1* | 1/2015 | Van De Sluis et al. ....... 315/312 |
| 2015/0102745 A1* | 4/2015 | Pijlman et al. ................ 315/291 |

FOREIGN PATENT DOCUMENTS

| | | |
|---|---|---|
| WO | 2006111934 A1 | 10/2006 |
| WO | 2007095740 A1 | 8/2007 |
| WO | 2009072053 A1 | 6/2009 |
| WO | 2010116299 A1 | 10/2010 |
| WO | 2011051865 A1 | 5/2011 |

* cited by examiner

SETTING UP HYBRID CODED-LIGHT—ZIGBEE LIGHTING SYSTEM

FIELD OF THE INVENTION

The invention relates in general to lighting systems, and more specifically to setting up a coded light network.

BACKGROUND OF THE INVENTION

A coded light illumination network typically comprises one center light source and one or more satellite light sources. The light sources may, e.g., be light bulbs based on solid-state light sources. The central light source is capable of communicating by visible coded light in addition to another communication protocol, such as ZigBee, WiFi, or Bluetooth. The satellite light sources, on the other hand, are only capable of communicating by means of visible coded light.

A user of a coded light network typically controls the light sources using a lighting control device, such as a hand-held remote control or a wall-mounted control device. The light settings of the light sources are controlled by control information which is transmitted from the lighting control device to the central light source. This control information is carried by a first communication link, such as ZigBee, WiFi, or Bluetooth, and by forwarding the control information from the central light source to the satellite light sources by way of a second communication link, i.e., coded light. In response to receiving the control information, the light sources adjust properties of the emitted light, such as on/off, the intensity, or the color, in accordance with the control information.

When installing lighting systems comprising light sources which are capable of communicating via ZigBee, WiFi, or Bluetooth, the light sources are typically linked to, i.e., associated with, a controller of the lighting system by way of proximity detection. This may, e.g., be achieved by holding the controller close to a light source, whereupon the light source detects, based on the received signal strength, the close proximity of the controller and links, or associates, the light source with the controller.

In coded light networks, however, the satellite light sources cannot directly communicate with the controller. Instead, the communication, and, in particular, the association, is effected by communication via the central light source which acts as a proxy. However, setting up a coded light network is hampered by interference from other satellite light sources within sight, but which do not belong to the lighting system to be commissioned. As a consequence, a satellite lighting device of a neighboring coded light network may accidentally be associated with the central lighting device of the lighting system to be commissioned.

SUMMARY OF THE INVENTION

It is an object of the present invention to provide a more efficient alternative to the above techniques and prior art.

More specifically, it is an object of the present invention to provide an improved way of associating, in a coded light network, satellite lighting devices with a central light device.

These and other objects of the present invention are achieved by means of lighting devices having features described herein, and by means of a method of a lighting system described herein.

According to a first aspect of the invention, a lighting device is provided. The lighting device comprises a light source, first communication means, second communication means, and controlling means. The light source is arranged for emitting coded light. The first communication means is arranged for transmitting and receiving data over a first communication link. The communication over the first communication link is preferably effected by means of a wireless radio-frequency based technology, such as ZigBee, WiFi, or Bluetooth. The second communication means is arranged for transmitting and receiving data over a second communication link. The communication over the second communication link is effected by means of the coded light emitted by the light source. The controlling means is arranged for receiving an association request over the first communication link, transmitting the association request over the second communication link, receiving an identifier of a satellite lighting device over the second communication link, and associating the satellite lighting device with the lighting device. The light source may, e.g., be a solid-state light source. The associating of the satellite lighting device with the lighting device may, e.g., be effected by storing the received identifier at the lighting device. Alternatively, the received identifier may be forwarded, over the first communication link, to a lighting control device, where it may be stored. The identifier of the satellite lighting device may, e.g., be a unique number or network address. In the following, an embodiment of the lighting device according to the first aspect of the invention is referred to as a central lighting device.

According to a second aspect of the invention, a lighting device is provided. The lighting device comprises a light source, communication means, and controlling means. The light source is arranged for emitting coded light. The communication means is arranged for transmitting and receiving data over a second communication link. The communication over the second communication link is effected by means of the coded light emitted by the light source. The controlling means is arranged for receiving an association request over the second communication link, and transmitting an identifier of the lighting device over the second communication link. The identifier is transmitted under the condition that an association process is enabled. The light source may, e.g., be a solid-state light source. The identifier may, e.g., be a unique number or network address. In the following, an embodiment of the lighting device according to the second aspect of the invention is referred to as a satellite lighting device.

According to a third aspect of the invention, a method of a lighting system is provided. The lighting system comprises a lighting control device, a central lighting device, and a satellite lighting device. The lighting system may comprise a plurality of satellite lighting devices. The lighting control device and the central lighting device are arranged for communicating over a first communication link. The communication over the first communication link is preferably effected by a wireless radio-frequency based technology, such as ZigBee, WiFi, or Bluetooth. The central lighting device and the satellite lighting device are arranged for communicating over a second communication link. The communication over the second communication link is effected by means of the coded light. The method comprises, at the lighting control device, transmitting, in response to a user request, an association request over the first communication link. The method further comprises, at the central lighting device, receiving the association request, and transmitting the association request over the second communication link. The method further comprises, at the satellite lighting device, receiving the association request, and transmitting an identifier of the satellite lighting device over the second communication link. The identifier is transmitted under the condition that an association process is enabled. The method further comprises, at the central lighting device, receiving the identifier of the satellite lighting device, and associating the satellite lighting device with the central lighting device. The identifier of the satellite lighting device may, e.g., be a unique number or network address.

The present invention makes use of an understanding that a coded light network may be set up, or commissioned, by way of an association process which is enabled, in response to a user request, only during a limited time period. For the purpose of describing the present invention, the task of setting up a coded light network amounts to associating the satellite light sources comprised in the network with a central light source of the network. This is achieved by way of an association process.

To this end, a coded light network comprises a central light source, at least one satellite light source, and a controller for adjusting light settings, i.e., properties of the emitted light, of the light sources comprised in the network. The communication between the controller and the central light source is effected by way of a first communication link, which is preferably based on a wireless radio-frequency technology. The communication between the central light source and the satellite light sources is effected by means of a second communication link, which is based on visible coded light, i.e., by modulating information onto the emitted light and by demodulating coded light received by a light detector. When setting up a coded light network, the central light source may be associated with the controller by way of proximity detection, as is known in the art. The satellite light sources may be associated with the central light source by way of an association request, initiated by a user of the light network by way of the controller. The association request is transmitted, using coded light, from the central light source to the satellite light sources. In response to receiving the association request, and under the condition that an association process is enabled, the satellite light sources transmit their respective identifiers over the second communication link. In response to receiving the identifiers of the satellite light sources at the central light source, the satellite light sources which have transmitted an identifier are associated with the central light source, and, by virtue of the first communication link between the central light source and the controller, with the controller of the coded light network. After the satellite light sources of the network have been associated with the central light source of the network, all light sources comprised in the network may be controlled, either individually or collectively, by means of the controller.

Transmitting the identifier of a satellite lighting device, thereby enabling an association between the satellite lighting device and the central light source receiving the identifier, only if an association process is enabled is advantageous since it mitigates the risk of interference from satellite light sources of neighboring lighting systems. In this way, the risk for accidental associations may be reduced. The association process may be enabled by a user of the coded light network, as is described hereinafter.

According to an embodiment of the invention, the association process is enabled during a predetermined time period after the satellite lighting device has been powered on for the first time. This is advantageous since a satellite lighting device which has just been installed is ready to be associated with a central light source of the network when it is powered on. The time period is typically of the order of a few seconds or a few tens of seconds.

According to another embodiment of the invention, the satellite lighting device further comprises a user-operable element. The association process is enabled during a predetermined time period after the user-operable element has been operated. This is advantageous since an existing association of a satellite lighting device with a central lighting device may be reset and the satellite lighting device may, subsequently, be re-associated. The user-operable element may, e.g., be a button or a switch which the satellite lighting device is equipped with. The reset is simply performed by pressing the button. The time period is typically of the order of a few seconds or a few tens of seconds.

According to yet another embodiment of the invention, the association process is enabled during a predetermined time period after a reset request is received by the communication means. The reset request is preferably received by means of coded light. For instance, a user of a coded light network may use a dedicated light emitting device being arranged for emitting a reset request by means of coded light. For instance, the user may use a device resembling a torch or a laser pointer for enabling the association process during a predetermined time period. This is advantageous in that the user may select a satellite lighting device, which he or she wants to associate, by simply pointing the dedicated light emitting device at the satellite lighting device. The time period is typically of the order of a few seconds or a few tens of seconds.

According to an embodiment of the invention, the communication means for effecting the communication by means of coded light is arranged for transmitting data over the second communication link by modulating the light emitted by the light source. The communication means is further arranged for receiving data over the second communication link by demodulating light detected by a light detector. The light detector is preferably arranged at the lighting device such that ambient light may reach the detector.

According to an embodiment of the first aspect of the invention, the controlling means is further arranged for receiving light settings over the first communication link, adjusting the properties of the emitted light in accordance with the light settings, and transmitting the light settings over the second communication link. The properties of the emitted light are adjusted under the condition that the light settings are intended for the lighting device.

According to an embodiment of the second aspect of the invention, the controlling means is further arranged for receiving light settings over the second communication link, and adjusting properties of the emitted light in accordance with the light settings. The properties of the emitted light are adjusted under the condition that the light settings are intended for the lighting device. This is advantageous since the light settings of the light sources comprised in a coded light network may be individually adjusted, as is desired by a user of the network. This may, e.g., be achieved by transmitting, together with the light settings, one or several identifiers of lighting devices for which the transmitted light settings are intended. When the light settings are received at a lighting device, either at a central lighting device or at a satellite lighting device, the lighting device compares the identifier received with the light settings to its own identifier. If the identifiers match, the lighting device adjusts its light settings in accordance with the received light settings.

According to an embodiment of the invention, a lighting system is provided. The lighting system comprises a central lighting device, a satellite lighting device, and a lighting control device. The lighting control device and the central lighting device are arranged for communicating over the first communication link. The central lighting device and the satellite lighting device are arranged for communicating over the second communication link. The lighting control device is arranged for transmitting an association request over the first communication link. The association request is transmitted in response to a user request. A lighting system, i.e., a coded light network, according to an embodiment of the invention is advantageous in that it comprises not only light sources which are capable of communicating through the first communication link, i.e., through ZigBee, WiFi, or Bluetooth, but also satellite light sources which only communicate though coded light. By utilizing a central light source and one or more satellite light sources, the costs for a lighting system may be reduced.

Even though embodiments of the present invention, and advantages thereof, have in some cases been described with reference to the lighting devices according to the first and second aspect of the invention, respectively, corresponding reasoning applies to embodiments of the method according to the third aspect of the invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF THE EMBODIMENTS

Figure 1:
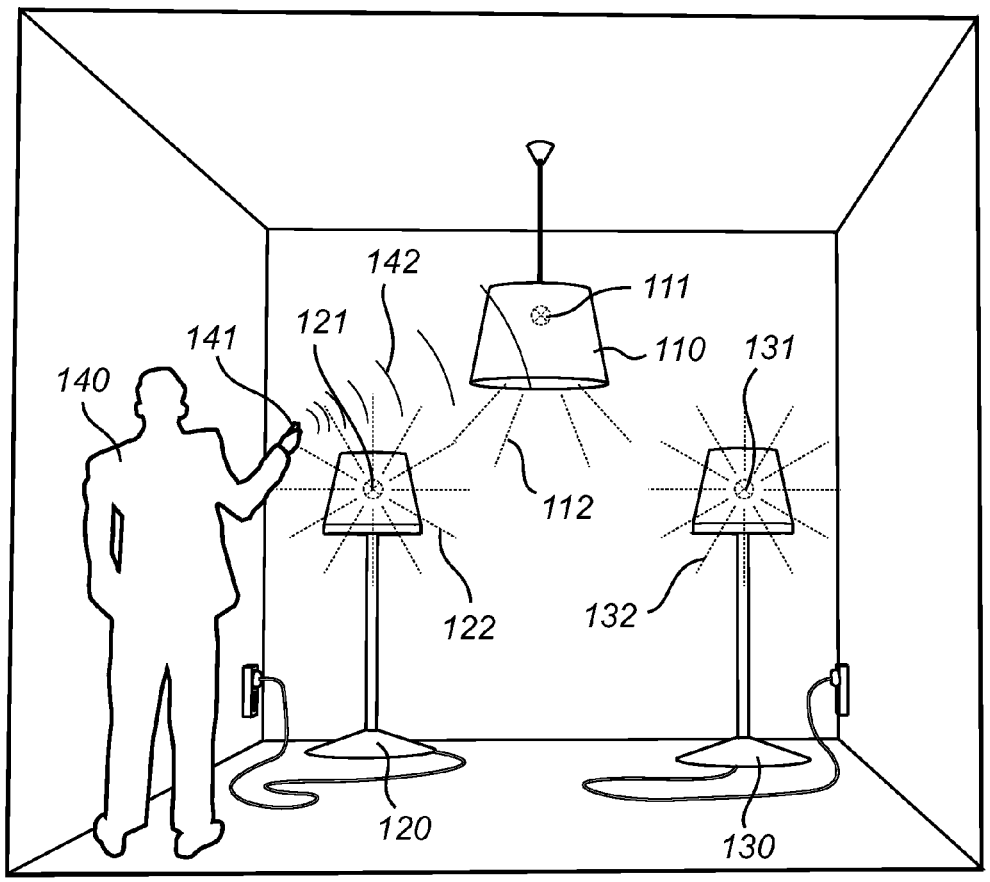
FIG. 1 shows a lighting system according to an embodiment of the invention.

In FIG. 1, a lighting system according to an embodiment of the invention is illustrated.

Lighting system 100 comprises a central lighting device 111, two satellite lighting devices 121 and 131, and a user-operable remote control 141 for adjusting light settings of lighting system 100, i.e., the properties of light 112, 122, and 132, emitted by lighting devices 111, 121, and 131, respectively. In FIG. 1, lighting devices 111, 121, and 131, are illustrated as light bulbs which may, e.g., be mounted in lamps 110, 120, and 130, respectively.

A user 140 of lighting system 100 may adjust properties of the emitted light 112, 122, and 132, using remote control 141. Properties of the emitted light include, but are not limited to, on/off, intensity, color temperature, beam width, or color. This may, e.g., be achieved by pressing buttons or moving levers on remote control 141. Remote control 141 is arranged for, in response to a user request, transmitting information, i.e., data, pertaining to a desired light setting over a first communication link 142 by means of a wireless radio-frequency based technology, such as ZigBee, WiFi, or Bluetooth. The communication over the first communication link may be effected in accordance with a first protocol. The information carried over the first communication link 142 is received by central lighting device 111. Central lighting device 111 is arranged for, in response to receiving the light settings, adjusting the properties of the emitted light 112 in accordance with the received light settings. Central lighting device 111 is further arranged for re-transmitting, in response to receiving the light settings, the light settings over a second communication link. The communication over the second communication link is effected by way of coded light, i.e., by modulating data onto the emitted light 112. The communication over the second communication link may be effected in accordance with a second protocol. The information transmitted by way of coded light 112 may subsequently be received by satellite lighting devices 121 and 131, which are arranged for adjusting the properties of emitted light 122 and 132, respectively, in accordance with the received light settings.

For lighting system 100 to work as is described hereinbefore, lighting devices 111, 121, and 131, are set up as a network such that information originating from remote control 141, e.g., light settings, may be received by the intended lighting devices 111, 121, and 131. In other words, lighting devices 111, 121, and 131, have to be associated with remote control 141. This may be achieved by associating central lighting device 111 with remote control 141, and satellite lighting devices 121 and 131 with central lighting device 111, thereby effectively linking satellite lighting devices 121 and 131 with remote control 141.

The association between central lighting device 111 and remote control 141, i.e., the first communication link, may, e.g., be established by way of proximity detection, as is known in the art. As an alternative, the association may also be established by performing a setting at remote control 141, e.g., by entering an identifier of central lighting device 111, or by way of hard-coding the identifier at remote control 141.

The association between satellite lighting devices 121 and 131, respectively, and central lighting device 111 may be established by transmitting information, i.e., data, comprising an association request, from central lighting device 111 to satellite lighting devices 121 and 131. The association request is transmitted in response to a user request. For instance, user 140 of lighting system 100 may press a dedicated button on remote control 141, thereby initiating the association process. Alternatively, the association request may be transmitted when the power button, or any other button, of remote control 141, is hold down for a short time. As yet a further alternative, the association process may be initiated at the same time when the association between central lighting device 111 and remote control 141 is effected, e.g., by means of proximity detection.

To this end, the association request message is sent over the second communication link, i.e., by means of coded light 112. In response to receiving the association request message, satellite lighting devices 121 and 131 transmit their respective identifiers back to central lighting device 111, under the condition that an association process is enabled at satellite lighting devices 121 and 131. In other words, satellite lighting devices 121 and 131 receiving the association request respond to the request only if an association has been enabled, i.e., is allowed, by user 140 of lighting system 100. In response to receiving the identifiers of satellite lighting devices 121 and 131 at central lighting device 111, the association process is completed by storing associations with satellite lighting devices 121 and 131. Storing an association may, e.g., be effected by storing the received identifiers in a memory at central lighting device 111. Alternatively, central lighting device 111 may transmit information pertaining to the associations, such as the received identifiers, to remote control 141, subsequent to which the identifiers are stored at remote control 141. After satellite lighting devices 121 and 131 have been associated with central lighting device 111, and, effectively, with remote control 141, user 140 may adjust the light settings of either of the lighting devices 111, 121, or 131, by using remote control 141.

The association process is restricted, as is described hereinbefore, to a limited time period controlled by user 140 of lighting system 100. In this way, the risk of accidental associations, which may be caused by association requests originating from a neighboring lighting system, may be reduced. To this end, satellite lighting devices 121 and 131 are arranged for performing an association only with assent from user 140 of lighting system 100. For instance, according to an embodiment of the invention, satellite lighting devices 121 and 131 may be arranged for accepting an association request received from central lighting device 111, and transmitting their respective identifier, only during a certain time period after satellite lighting devices 121 and 131 have been powered on for the first time.

Figure 2:
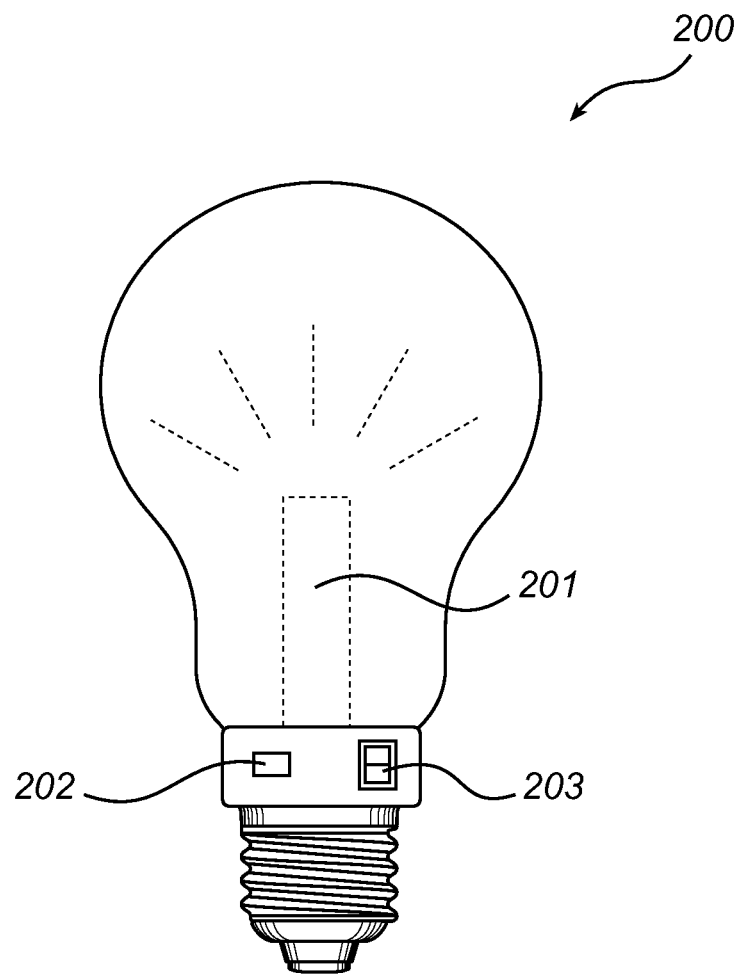
FIG. 2 shows a satellite light bulb according to an embodiment of the invention.

With respect to FIG. 2, a satellite lighting device according to another embodiment of the invention is described.

Satellite lighting device 200, in FIG. 2 illustrated as a light bulb, comprises a light source 201, a receiver 202 for receiving information, i.e., data, transmitted by means of coded light over the second communication link, and a button 203. Light source 201 may, e.g., be a solid-state light source which is arranged for emitting coded light by modulating the emitted light. Receiver 202 comprises an optical sensor, i.e., a light detector, for detecting visible light and means for extracting the information carried by the coded light. Button 203 may be used for enabling an association process for satellite lighting device 200, such as satellite lighting devices 121 and 131, with a central lighting device, such as central lighting device 111, described with reference to FIG. 1. This may be accomplished by pressing button 203, subsequent to which satellite lighting device is arranged to respond to an association request by transmitting its identifier over the second communication link.

It will be appreciated that, even though optical sensor 202 and button 203 are depicted to be arranged on the side of light bulb 200, other locations of sensor 202 and button 203 may easily be envisaged. Preferably, button 203 is arranged such that it is easily accessible by a user, and sensor 202 is arranged such that ambient light may be detected.

Figure 3:
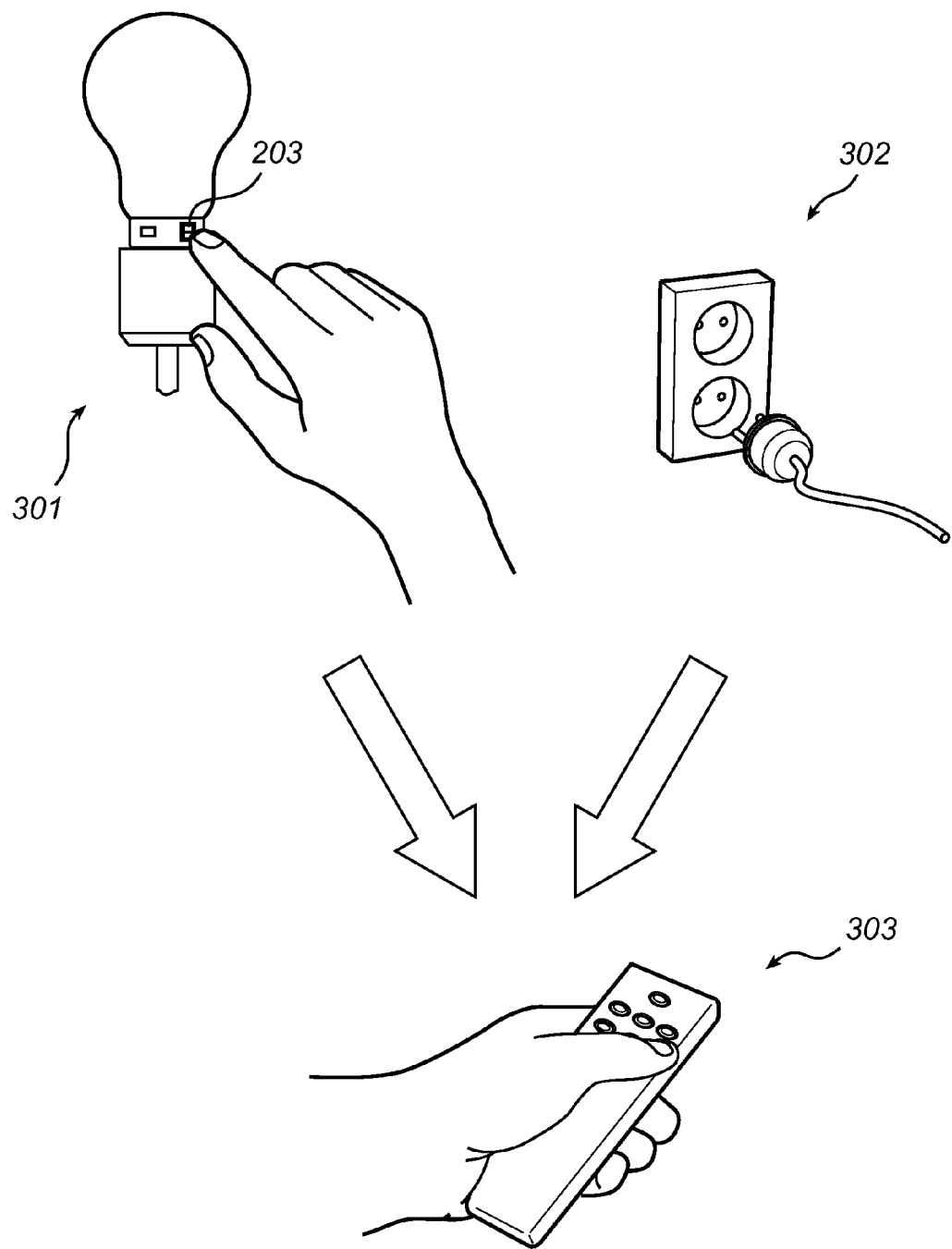
FIG. 3 illustrates the usage of a lighting system according to an embodiment of the invention.

In FIG. 3, it is illustrated how user 140 of lighting system 100, described with reference to FIG. 1, may perform the association of a satellite lighting device, e.g., lighting device 121, with central lighting device 111.

First 301, user 140 presses a button on satellite lighting device 121, such as button 203 on satellite lighting device 200, described with reference to FIG. 2, for enabling the association process. Subsequently 303, user 140 presses a button on remote control 141 of lighting system 100. In response to pressing the button, remote control 141 transmits an association request to central lighting device 111 which, in turn, re-transmits the association request to satellite lighting device 121. Under the condition that satellite lighting device 121 has received the association request during the time period which is started by pressing the button on satellite lighting device 121, thereby enabling the association process, satellite lighting device 121 transmits its identifier to central lighting device 111 which effects the association. After the association has been performed, unless a re-association to a different central lighting device is performed, satellite lighting device 121 will adjust its light settings in accordance with received light settings intended for lighting device 121, under the condition that the light settings are transmitted by central lighting device 111, which, in turn, has received control information from remote control 141.

With reference to FIG. 3, the usage of an alternative embodiment of the satellite lighting device, such as satellite lighting devices 121 and 131, described with reference to FIG. 1, or satellite lighting device 200, described with reference to FIG. 2, is described. According to an embodiment of the invention, the satellite lighting device may be arranged for transmitting its identifier in response to receiving an association request only during a time interval which starts when satellite lighting device 121 is powered on for the first time. This may, e.g., be achieved by starting a timer, which satellite lighting device 121 is equipped with, when satellite lighting device 121 is powered on for the first time, e.g., when a lamp fitted with satellite lighting device 121 is connected to an electrical outlet, as is illustrated in step 302.

Even though the invention has been described with respect to a lighting system, or a coded light network, comprising one central light source and at least one satellite light source, one may envisage lighting systems comprising more than one central light source. If a plurality of central light sources is used, all central light sources may, e.g., be associated with one and the same lighting controller and may be controlled either collectively or individually. Optionally, the central light sources may be linked with different lighting controllers and may be controlled individually.

The person skilled in the art realizes that the present invention by no means is limited to the embodiments described above. On the contrary, many modifications and variations are possible within the scope of the appended claims. For example, an embodiment of the central lighting device may further comprise means for converting information received over the first communication link before re-transmitting the information over the second communication link. For this purpose, the central lighting device may be equipped with means for converting the first protocol to the second protocol, and vice versa.

In conclusion, a lighting system comprising a central lighting device, at least one satellite lighting device, and a controller for adjusting light settings, is provided. The controller is arranged for transmitting, in response to a user request, an association request over a first communication link. The central lighting device is arranged for receiving the association request and re-transmitting the association request over a second communication link by means of coded light. The satellite lighting device is arranged for transmitting, in response to receiving the association request, its identifier to the central lighting device. The identifier is only transmitted if an association process is enabled. The association process is enabled, in response to a user request, during a limited time period. The central lighting device is further arranged for associating, in response to receiving the identifier, the satellite lighting device with the central lighting device.

The invention claimed is:

1. A lighting device comprising:
   a light source being arranged for emitting coded light,
   a first communication device being arranged for transmitting and receiving data over a first communication link,
   a second communication device being arranged for transmitting and receiving data over a second communication link by means of the coded light, and
   a controlling unit being arranged for:
   receiving an association request over the first communication link,
   transmitting the association request over the second communication link, receiving an identifier of a satellite lighting device over the second communication link, and associating the satellite lighting device with the lighting device.

2. The lighting device according to claim 1, wherein the second communication device is arranged for:

transmitting data over the second communication link by modulating the light emitted by the light source, and receiving data over the second communication link by demodulating light detected by a light detector.

3. The lighting device according to claim 1, wherein the controlling unit is further arranged for:

receiving light settings over the first communication link, adjusting, under a condition that the light settings are intended for the lighting device, the properties of the emitted light in accordance with the light settings, and transmitting the light settings over the second communication link.

4. A lighting device comprising:

a light source being arranged for emitting coded light, a communication device being arranged for transmitting and receiving data over a second communication link by means of the coded light, and a controlling unit being arranged for:

initiating a predetermined time period;

receiving an association request over the second communication link, and transmitting, under a condition that said time period has not elapsed, an identifier of the lighting device over the second communication link.

5. The lighting device according to claim 4, wherein said initiating is performed in response to powering on of the lighting device for the first time.

6. The lighting device according to claim 4, further comprising a user-operable element, wherein said initiating is performed in response to operation of the user-operable element.

7. The lighting device according to claim 4, wherein said initiating is performed in response to receiving a reset request by the communication device.

8. The lighting device according to claim 4, wherein the communication device is arranged for:

transmitting data over the second communication link by modulating the light emitted by the light source, and receiving data over the second communication link by demodulating light detected by a light detector.

9. The lighting device according to claim 4, wherein the controlling unit is further arranged for:

receiving light settings over the second communication link, and adjusting, under a condition that the light settings are intended for the lighting device, properties of the emitted light in accordance with the light settings.

10. A lighting system comprising:

the lighting device according to claim 1, wherein said lighting device is a central lighting device;

a satellite lighting device and a lighting control device, the lighting control device and the central lighting device being arranged for communicating over the first communication link, and the central lighting device and the satellite lighting device being arranged for communicating over the second communication link, wherein the lighting control device is arranged for transmitting, in response to a user request, an association request over the first communication link.

11. The lighting system according to claim 10, wherein the lighting control device is further arranged for transmitting, in response to a user request, light settings intended for at least one of the central lighting device or the satellite lighting device over the first communication link.

12. The lighting system according to claim 10, wherein the satellite lighting device is arranged for:

initiating a predetermined time period; and transmitting, under the condition that said time period has not elapsed, an identifier of the lighting device over the second communication link.

* * * * *